United States Patent [19]

Sawata

[11] Patent Number: 5,122,718

[45] Date of Patent: Jun. 16, 1992

[54] GAIN/PHASE COMPENSATION CIRCUIT FOR USE IN SERVO CONTROL SYSTEM OF OPTICAL DISK DEVICE

[75] Inventor: Hisashi Sawata, Tokyo, Japan

[73] Assignee: NEC Corporation, Tokyo, Japan

[21] Appl. No.: 497,163

[22] Filed: Mar. 22, 1990

[30] Foreign Application Priority Data

Mar. 22, 1989 [JP] Japan ................................. 1-71207

[51] Int. Cl.⁵ .............................................. G05B 6/02
[52] U.S. Cl. .............................. 318/621; 364/724.16;
364/724.17; 364/724.01; 364/724.1
[58] Field of Search .................... 318/621; 364/724.16,
364/724.17, 724.01, 724.1

[56] References Cited

U.S. PATENT DOCUMENTS

| 4,521,867 | 6/1985 | Kasuga | 364/724.17 |
| 4,700,345 | 10/1987 | Morcom et al. | 364/724.16 |
| 4,893,316 | 1/1990 | Janc et al. | 364/724.1 X |
| 4,961,160 | 10/1990 | Sato et al. | 364/724.01 |

OTHER PUBLICATIONS

"Digital Filters and Signal Processing" L. B. Jackson; Kluwer Academic Publishers 1989 pp. 298-301.

*Primary Examiner*—William M. Shoop, Jr.
*Assistant Examiner*—Saul M. Bergmann
*Attorney, Agent, or Firm*—Sughrue, Mion, Zinn, Macpeak & Seas

[57] ABSTRACT

A gain and phase compensation circuit for use in the servo control system for an optical disk device comprises a digital signal input terminal for receiving an input digital signal to be treated, a first digital filter circuit having an input connected to the digital signal input terminal for compensating a gain of a low frequency band for the input digital signal, a second digital filter circuit having an input connected to the digital signal input terminal for compensating a phase of a high frequency band for the input digital signal, and an output circuit having a first input connected to an output of the first digital filter circuit and a second input connected to an output of the second digital filter circuit for combining the output of the first digital filter circuit with the output of the second digital filter circuit so as to generate a digital servo control signal. The first digital filter circuit includes a down sampling circuit connected to receive the input digital signal for generating a modified digital signal having a sampling frequency lower than that of the second digital filter circuit, a low pass digital filter connected to receive the modified digital signal for compensating a gain of the modified digital signal at the lower sampling frequency, and a hold circuit connected to an output of the low pass digital filter for outputting to the output circuit the output of the low pass digital filter at the same sampling frequency as that of the second digital filter circuit.

6 Claims, 2 Drawing Sheets

GAIN/PHASE COMPENSATION CIRCUIT FOR USE IN SERVO CONTROL SYSTEM OF OPTICAL DISK DEVICE

BACKGROUND OF THE INVENTION

1. Field of the Invention

The present invention relates to a servo control system for an optical disk device, and more specifically to a gain and phase compensation circuit for use in a servo control system, such as, a focus servo control system, a tracking servo control system, a sled servo control system, and a spindle servo control system, for an optical disk device.

2. Description of Related Art

A servo control system used in an optical disk device has been required to compensate for a gain in a low frequency band and a phase at a gain crossover (in a high frequency band) in order to sufficiently satisfy a tracking performance defined under a predetermined standard.

For this purpose, a conventional servo control system has been composed of, for example, a low pass digital filter for a gain compensation in a low frequency band and a high pass digital filter for a phase compensation in a high frequency band. The two digital filters are coupled in a cascaded manner or in a parallel connection manner in order to concurrently attain respective functions of the two types of digital filters. In this case, the two digital filters have the same sampling frequency, which is sufficiently higher than a frequency (in a high frequency band) for which a phase compensation is required.

In brief, in the case of the cascaded connection, a digital signal input terminal is connected to an input of a low pass digital filter for a gain compensation in a low frequency band, and an output of the low pass digital filter is connected to an input of a high pass digital filter for a phase compensation at a gain crossover (in a high frequency band). An output of the high pass digital filter is connected to an output terminal. In the case of the parallel connection, on the other hand, a digital signal input terminal is connected commonly to an input of a low pass digital filter for a gain compensation in a low frequency band, and an input of a high pass digital filter for a phase compensation at a gain crossover (in a high frequency band). An output of the low pass digital filter and an output of the high pass digital filter are connected to two inputs of an adder, respectively, and an output of the adder is connected to an output terminal. In both of the cascaded connection and the parallel connection, both of the high pass digital filter and the low pass digital filter are driven to perform a filtering with the same sampling frequency.

In the above mentioned servo control system for the optical disk device, a frequency band to be controlled or treated by the low pass digital filter is too apart from the sampling frequency, and therefore, it is disadvantageous that a required word length of coefficients of the digital filter has to be greatly long. The reason for this is that coefficients and the frequency characteristics of a digital filter depend upon a sampling frequency. For example, assuming that the frequency to be treated by the digital filter is fixed, the higher the sampling frequency is, the longer the required coefficient word length becomes. In addition, the lower the frequency to be treated by the digital filter is, the longer the required coefficient word length also becomes. Furthermore, in order to control at the same frequency precision, the higher the sampling frequency is, the longer the required coefficient word length becomes. In this case, considering the frequency in logarithms, the lower the frequency to be treated by the digital frequency is, the longer the required coefficient word length also becomes.

SUMMARY OF THE INVENTION

Accordingly, it is an object of the present invention to provide a digital servo control circuit which has overcome the above mentioned defect of the conventional one.

Another object of the present invention is to provide a digital servo control circuit of the parallel connection type having a low pass digital filter which does not require a long coefficient word length.

The above and other objects of the present invention are achieved in accordance with the present invention by a gain and phase compensation circuit for use in the servo control system for an optical disk device comprising a signal input terminal for receiving an input digital signal to be treated, a first filter circuit having an input connected to the signal input terminal for compensating a gain of a low frequency band for the input digital signal, a second filter circuit having an input connected to the signal input terminal for compensating a phase of a high frequency band for the input digital signal, and an output circuit having a first input connected to an output of the first filter circuit and a second input connected to an output of the second filter circuit for combining the output of the first filter circuit with the output of the second filter circuit so as to generate a digital servo control signal, the first filter circuit including a down sampling circuit connected to receive the input digital signal for generating a modified digital signal having a sampling frequency lower than that of the second filter circuit, a low pass digital filter connected to receive the modified digital signal for compensating a gain of the modified digital signal at the lower sampling frequency, and a hold circuit connected to an output of the low pass digital filter for outputting to the output circuit the output of the low pass digital filter at the same sampling frequency as that of the second filter circuit.

The above and other objects, features and advantages of the present invention will be apparent from the following description of preferred embodiments of the invention with reference to the accompanying drawings.

DESCRIPTION OF THE PREFERRED EMBODIMENT

Figure 1:
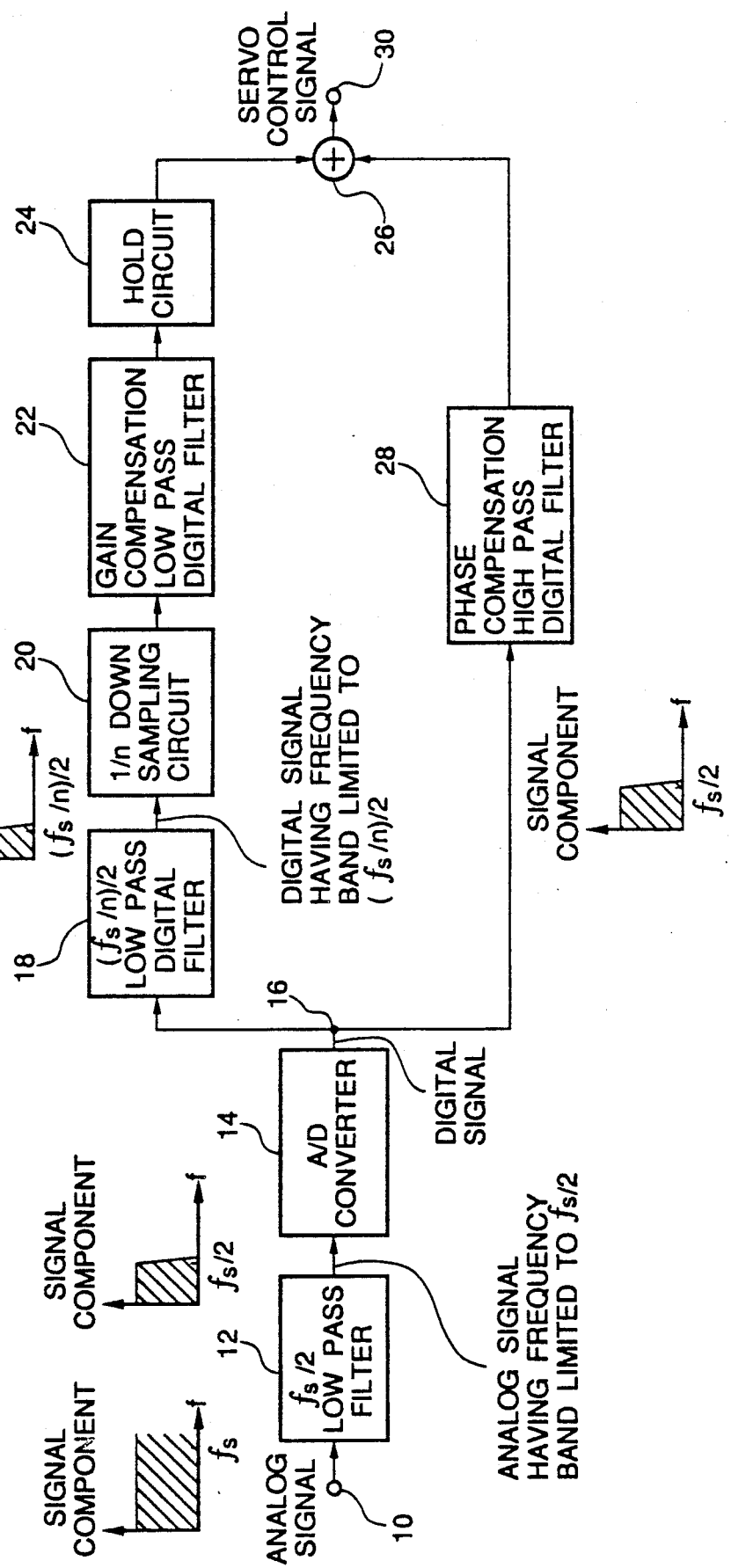
FIG. 1 is a block diagram of one embodiment of the gain and phase compensation circuit in accordance with the present invention for use in the servo control system for an optical disk device.

Referring to FIG. 1, there is shown a block diagram of one embodiment of the gain and phase compensation circuit in accordance with the present invention for use in the servo control system for an optical disk device. In FIG. 1, each of the small graphs depicted beside various signal lines indicates a frequency spectrum of a signal flowing through the side-located signal line.

The shown circuit includes an input terminal 10 for receiving an analog signal used for a servo control. This input terminal 10 is connected to an input of a low pass analog filter 12 having a cut-off frequency of $f_s/2$ where $f_s$ is a sampling frequency, so that the input analog signal is filtered to have an upper limit frequency of $f_s/2$. Here, it should be understood that $f_s$ is determined to be sufficiently higher than a frequency for which a phase compensation is required.

A frequency limited analog signal outputted from the analog low pass filter 12 is inputted to an A/D (analog-to-digital) converter 14, so that the frequency limited analog signal is converted to a digital signal to be used for servo control.

The digital signal thus obtained is supplied through a digital signal input node 16 to an input of a low pass digital filter 18 having a cut-off frequency of $(f_s/n)/2$ where "n" is a positive integer and $f_s/n$ is a sampling frequency of a low pass digital filter for a low frequency band gain compensation, explained hereinafter. Therefore, a down sampling is required. For this purpose, the digital signal having an upper limit frequency of $(f_s/n)/2$ outputted from the low pass digital filter 18 is supplied to a (1/n) down sampling circuit 20. Thus, with a lowered sampling frequency of $f_s/n$, the digital signal is applied to a low pass digital filter 22 for a low frequency band gain compensation. This low pass digital filter 22 operates to filter the received digital signal at the sampling frequency of $f_s/n$.

A digital signal filtered by the low pass digital filter 22 has the sampling frequency of $f_s/n$, and therefore, it is necessary to restore the original sampling frequency in the filtered signal. For this purpose, an output of the low pass digital filter 22 is connected to an input of a hold circuit 24. Since the low pass digital filter 22 outputs its filtered signal only $f_s/n$ times per second, the hold circuit 24 operates to hold the output of the low pass digital filter 22 for each period of $n/f_s$ second, but to output the held signal at an every $1/f_s$ second. An output of the hold circuit 24 is connected to one input of a digital adder 26.

On the other hand, the digital signal thus obtained supplied through the digital signal input node 16 is also applied to an input of a high pass digital filter 28 for a phase compensation in a gain crossover (high frequency band). An output of the high pass digital filter 28 is connected to the other input of the digital adder 26.

Thus, the digital adder 26 outputs to an output terminal 30 a servo control signal having a gain compensated low frequency component and a phase compensated high frequency component.

Figure 2:
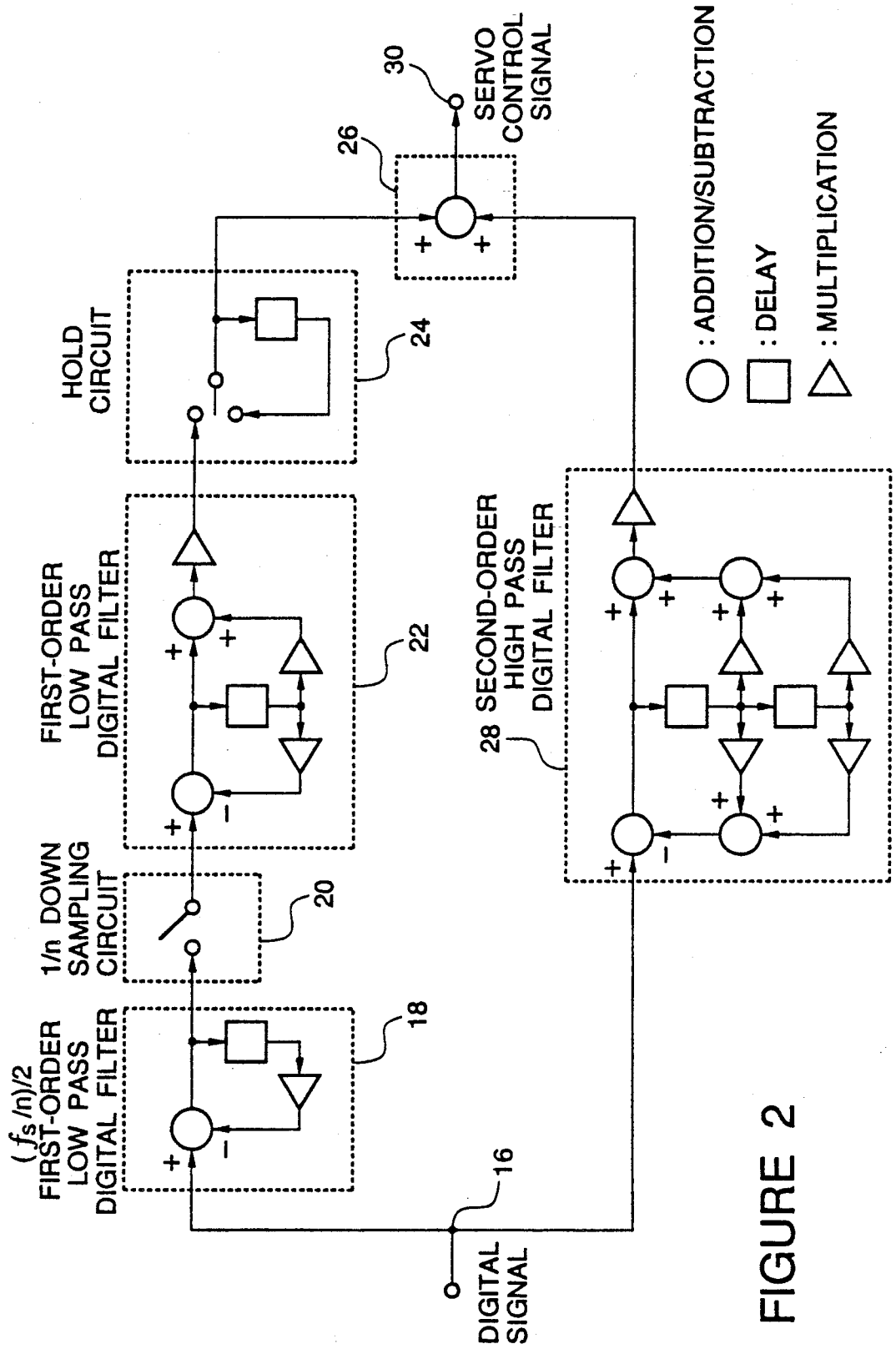
FIG. 2 is a detailed block diagram of a digital circuit portion of the gain and phase compensation circuit shown in FIG. 1.

Turning to FIG. 2, there is shown a detailed block diagram of a digital circuit portion of the gain and phase compensation circuit shown in FIG. 1. In FIG. 2, each graphic symbol "circle" indicates an addition/subtraction element, and which of an addition element and a subtraction element is indicated by the symbol "circle" would be understood from signs "+" and "−" added to two inputs of the symbol "circle". Furthermore, each graphic symbol "rectangle" represents a delay element, and each graphic symbol "triangle" designates a multiplication element.

As seen from FIG. 2, the low pass digital filter 18 can be formed of a first-order digital filter composed of one subtraction element, one delay element and one multiplication element, which are connected as shown in one basic form of digital filter well known to persons skilled in the art. The (1/n) down sampling circuit 20 can be composed of a switching element which is connected between the output of the low pass digital filter 18 and the input of the low pass digital filter 22 and which is momentarily closed at each constant interval of $n/f_s$ second. The low pass digital filter 22 can be formed of a first-order digital filter composed of one subtraction element, one addition element, one delay element and three multiplication elements, which are connected as shown in another basic form of digital filter well known to persons skilled in the art. This first-order digital filter 22 is driven with a sampling frequency of $f_s/n$. The hold circuit 24 can be formed of one selecting switch element and one delay element connected as shown. The selecting switch element is momentarily put at each constant interval of $n/f_s$ second into a position of connecting the output of the first-order digital filter 22 to the delay element of the hold circuit 24, so that the output of the first-order digital filter 22 is inputted to the delay element. For the other period of time, the selecting switch element is maintained in a position of interconnecting the output and the input of the delay element of the hold circuit 24, so that the output of the delay element is continuously supplied to the one input of the digital adder 26 until the content of the delay element is updated.

On the other hand, the high pass digital filter 28 for the phase compensation in the gain crossover (high frequency band) can be formed of a second-order digital filter composed of one subtraction element, three addition elements, two delay elements and five multiplication elements, which are connected as shown in still another basic form of digital filter well known to persons skilled in the art. This second-order digital filter 28 is driven to perform a filtering operation with a sampling frequency of $f_s$.

As seen from the above mentioned description of the embodiment, the low pass filtering operation for the low frequency band gain compensation is performed after down-sampling the digital signal at a frequency lower than the sampling frequency for the high pass digital filter for the phase compensation in the gain crossover (high frequency band), and the the low pass digital filter for the low frequency band gain compensation and the high pass digital filter for the gain crossover phase compensation are connected in parallel to each other. Therefore, a filtering characteristics required for a servo control operation over a wide range from a low frequency band to a high frequency band can be realized with a short coefficient word length of digital filter.

The invention has thus been shown and described with reference to the specific embodiment. However, it should be noted that the present invention is in no way limited to the details of the illustrated structures but changes and modifications may be made within the scope of the appended claims.

I claim:

1. A gain and phase compensation circuit for use in the servo control system for an optical disk device comprising a digital signal input terminal for receiving an input digital signal, a first circuit means having an input connected to said digital signal input terminal for compensating for a gain of said servo control system in a low frequency band of said input digital signal, a second digital filter circuit having an input connected to said digital signal input terminal for compensating a phase of a high frequency band of said input digital signal, and an output circuit having a first input connected to an output of said first circuit means and a second input connected to an output of said digital filter circuit for combining said output of said first circuit means with said output of said digital filter circuit so as to generate a digital servo control signal, said first circuit means including a first low pass digital filter, a down sampling circuit connected to receive an output digital signal of said first low pass digital filter for generating a modified digital signal having a sampling frequency lower than that of said digital filter circuit, a second low pass digital filter connected to receive said modified digital signal for filtering the modified digital signal at said lower sampling frequency, and a hold circuit connected to an output of said second low pass digital filter for holding said output of said low pass digital filter for a period defined by said sampling frequency so as to output to said output circuit said held output of said second low pass digital filter regardless of a sampling frequency of said digital filter circuit.

2. The gain and phase compensation circuit claimed in claim 1, wherein said first low pass digital filter has an input connected to said signal digital input terminal for outputting a digital signal having a frequency which is lower than said lower sampling frequency.

3. The gain and phase compensation circuit as claimed in claim 2, further including an analog signal input terminal for receiving an analog signal, a low pass analog filter having an input connected to said analog input terminal for outputting a signal having a frequency component which is lower than said sampling frequency of said first circuit means, and an analog-to-digital converter having an input connected to an output of said low pass analog filter, an output of said analog-to-digital converter being connected to said digital signal input terminal.

4. The gain and phase compensation circuit as claimed in claim 3, wherein said low pass analog filter operates to output a signal having said frequency component not to exceed a half of said sampling frequency of said digital filter circuit, wherein said first low pass digital filter operates to restrict said frequency component of said input digital signal not to exceed $\frac{1}{2}n$ of said sampling frequency of said digital filter circuit where "n" is a positive integer, wherein said down sampling circuit operates to output said modified digital signal at said lower sampling frequency which is equal to 1/n of said sampling frequency of said digital filter circuit, and wherein said second low pass digital filter operates to filter said modified digital signal having a frequency component which is less than said lower sampling frequency which is equal to 1/n of sampling frequency of said digital filter circuit.

5. A gain and phase compensation circuit for use in the servo control system for an optical disk device comprising:

a digital signal input terminal for receiving an input digital signal;

a high pass digital filter circuit having an input connected to said digital signal input terminal for compensating a phase in a high frequency band for said input digital signal;

a first low pass digital filter having an input connected to said signal input terminal for restricting a frequency spectrum of said input digital signal not to exceed a value which is lower than a sampling frequency of said input digital signal;

a down sampling circuit connected to an output of said first low pass digital filter for generating a modified digital signal having a sampling frequency lower than that of said high pass digital filter circuit;

a second low pass digital filter connected to receive said modified digital signal for gain-compensating the modified digital signal at said lower sampling frequency;

a hold circuit connected to an output of said second low pass digital filter for holding said output of said second low pass digital filter for a period defined by said lower sampling frequency regardless of a sampling frequency of said high pass digital filter circuit; and an output circuit having a first input connected to an output of said high pass digital filter circuit and a second input connected to an output of said hold circuit for combining said output of said high pass digital filter circuit with said output of said hold circuit so as to generate a digital servo control signal.

6. A gain and phase compensation circuit for use in the servo control system for an optical disk device comprising:

a digital signal terminal for receiving an input digital signal;

a second-order high pass digital filter circuit having an input connected to said digital signal input terminal for compensating a phase in a high frequency band for said input digital signal;

a first low pass digital filter having an input connected to said signal input terminal for restricting a frequency spectrum of said input digital signal not to exceed $\frac{1}{2}n$ of a sampling frequency of said high pass digital filter circuit where "n" is a positive integer;

a down sampling circuit connected to an output of said first low pass digital filter for generating a modified digital signal having a sampling frequency which is equal to 1/n of said sampling frequency of said high pass digital filter circuit, a second low pass digital filter of a first-order connected to receive said modified digital signal for gain-compensating the modified digital signal at said lower sampling frequency;

a hold circuit connected to an output of said second low pass digital filter for sampling said output of said second low pass digital filter at said lower sampling frequency so as to output the sampled output of said second low pass digital filter for a period defined by said lower sampling frequency regardless of said sampling frequency of said high pass digital filter circuit; and an output circuit having a first input connected to an output of said high pass digital filter circuit and a second input connected to an output of said hold circuit for combining said output of said high pass digital filter circuit with said output of said hold circuit so as to generate a digital servo control signal.

* * * * *